March 30, 1926.  1,578,787
J. WESTREN
PROCESS OF FORMING BATTERY JARS AND THE LIKE
Filed Feb. 9, 1925
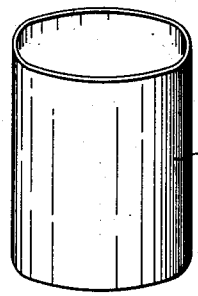
FIG.1.
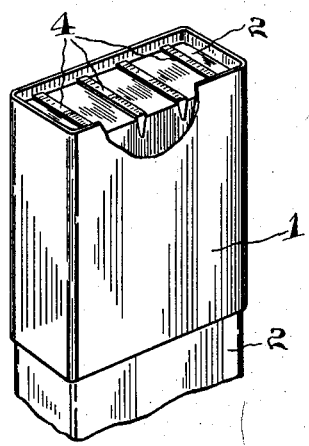
FIG.2.
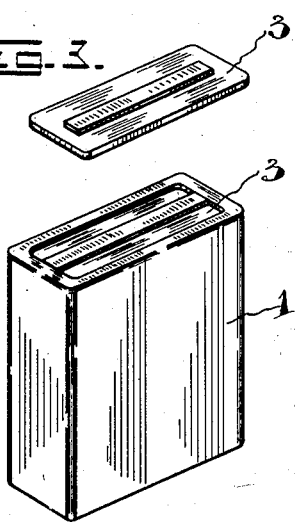
FIG.3.
FIG.4.
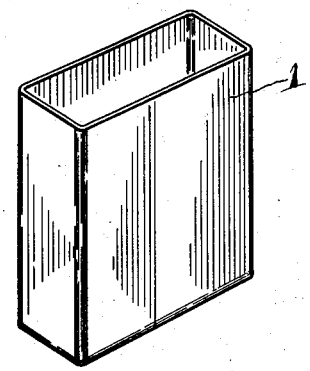
FIG.5.
INVENTOR
J. Westren
BY J. Edward Maybee
ATTY.

Patented Mar. 30, 1926.

1,578,787

UNITED STATES PATENT OFFICE.

JOHN WESTREN, OF TORONTO, ONTARIO, CANADA, ASSIGNOR TO DUNLOP TIRE & RUBBER GOODS CO. LIMITED, OF TORONTO, CANADA.

PROCESS OF FORMING BATTERY JARS AND THE LIKE.

Application filed February 9, 1925. Serial No. 7,840.

*To all whom it may concern:*

Be it known that I, JOHN WESTREN, of the city of Toronto, in the county of York, Province of Ontario, Canada, a subject of the King of Great Britain, have invented certain new and useful Improvements in Processes of Forming Battery Jars and the like, of which the following is a specification.

This invention relates to jars formed of rubber compounds and particularly adapted for use as battery jars, and my object is to form such a jar without a body seam whereby a jar of improved appearance is obtained and with walls of substantially even thickness everywhere.

I attain my object by extruding a suitable rubber compound from an annular die to form a tube.

Suitable lengths are cut from the tube to form what may be termed body blanks. A body blank is then drawn over a metal core of the desired shape of the interior of the box and is left projecting about ½" above the end of the core.

The core is notched to receive strips of rubber compound to form ribs in the bottom of the box.

A bottom cut to shape is then placed on the end of the core in contact with the strips and within the projecting end of the body blank, which is then turned down over the bottom and substantially coalesced therewith.

The box is then ready for vulcanization.

The result is a box having a body with smooth unbroken walls, no seams or joints being visible except beneath the bottom.

The box and its process of manufacture are illustrated in the accompanying drawings in which—

Fig. 1 is a perspective view of an extruded tubular body blank;

Fig. 2 is a perspective view, partly broken away, showing a partly formed box in position on a core;

Fig. 3 a perspective view of the bottom blank;

Fig. 4 a perspective view of a finished box upside down; and

Fig. 5 a perspective view of a finished box in normal position.

The tubular blank 1 shown in Fig. 1 is drawn over the core 2 shown in Fig. 2.

The cut out bottom 3 shown in Fig. 3 is fitted on top of the core in contact with the rubber strips 4 set in the recesses in the end of the core.

The projecting part of the tube is then turned down over the bottom as shown in Fig. 4.

The jar is then vulcanized, and, when withdrawn from the core, appears as shown in Fig. 5.

What I claim is:—

1. A process of forming a rubber jar which consists in extruding a seamless tube of rubber compound; forming the tube over a core; placing a bottom in position on the core; turning down the edges of the tube over the bottom; and vulcanizing the finished jar.

2. A process of forming a rubber jar which consists in extruding a seamless tube of rubber compound; forming the tube over a core; positioning strips of rubber on the core to form ribs inside the bottom of the jar; placing a bottom in position on the strips and core; turning down the edges of the tube over the bottom; and vulcanizing the finished jar.

Signed at Toronto, Canada, this 4th day of February, 1925.

JOHN WESTREN.